May 6, 1952  J. H. GOSS ET AL  2,595,244
METER DAMPING MAGNET STRUCTURE
Original Filed March 30, 1948  2 SHEETS—SHEET 1
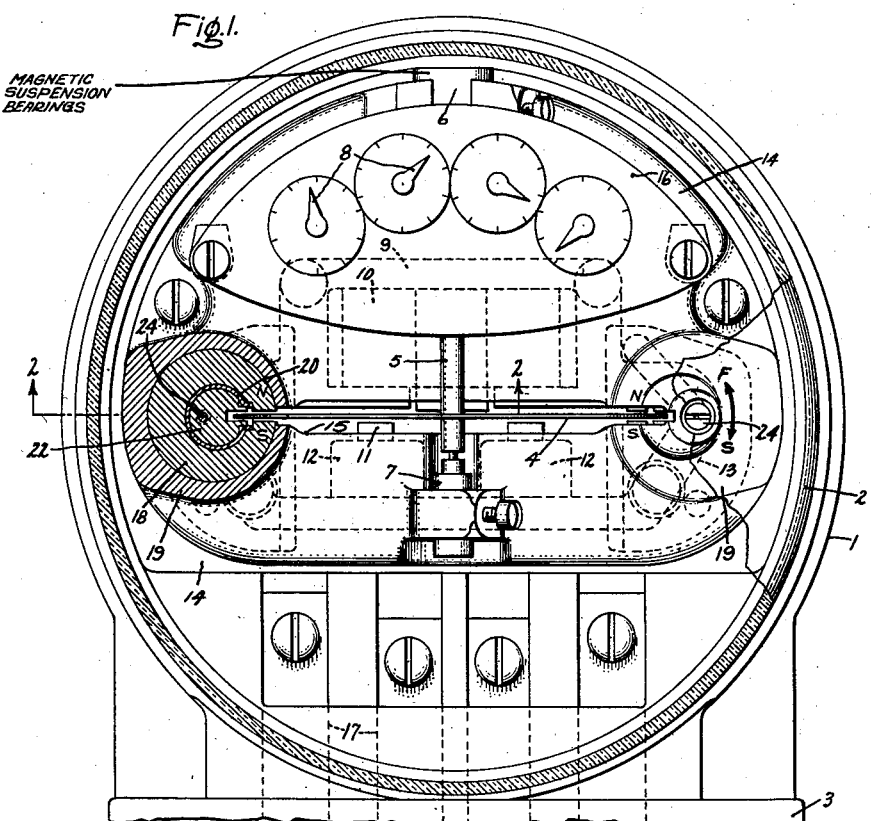
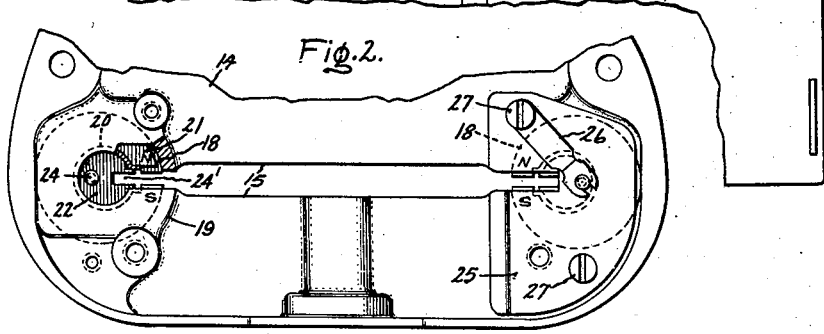
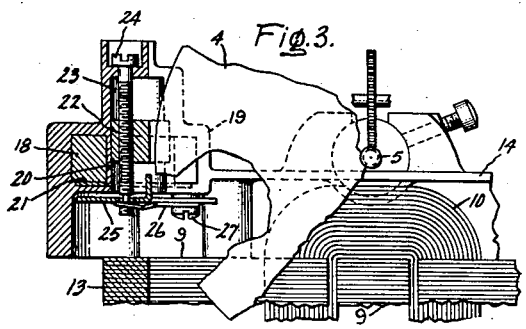
Inventors:
James H. Goss,
Lewis I. Mendelsohn,
Hans A. Bakke,
by Prowell S. Mack
Their Attorney.

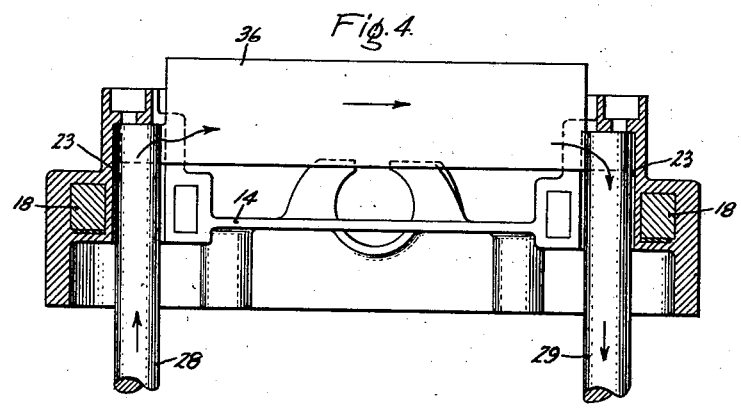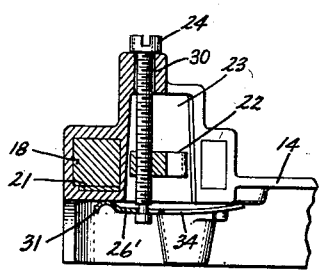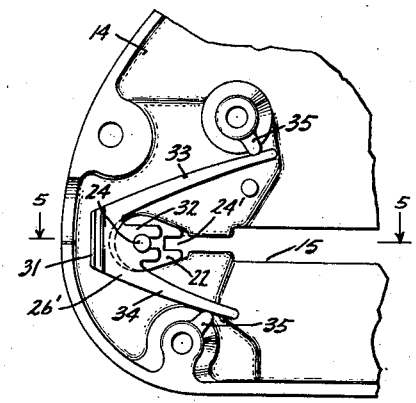

Patented May 6, 1952

2,595,244

UNITED STATES PATENT OFFICE 2,595,244

METER DAMPING MAGNET STRUCTURE

James H. Goss, Schenectady, N. Y., and Lewis I. Mendelsohn, Lynn, and Hans A. Bakke, Swampscott, Mass., assignors to General Electric Company, a corporation of New York Original application March 30, 1948, Serial No. 17,884. Divided and this application May 6, 1950, Serial No. 160,475

4 Claims. (Cl. 171—34)

This is a division of our application Serial No. 17,884, filed March 30, 1948, entitled "Unitary Integrating Meter and Damping Magnet Structure."

Our parent application relates primarily to a novel supporting arrangement for the drag magnets of integrating meters and their assembly relation relative to other associated parts of such meters, wherein relatively small but powerful damping magnets are embedded in a nonmagnetic conducting material comprising the meter frame.

This divisional application relates primarily to the damping magnet supporting and protective features per se and to the temperature compensation and load adjusting features of such magnets. One object of the present invention is to offer protection to the damping magnets by embedding them in a nonmagnetic conducting material. The magnets are small, fixed in place, and relatively inaccessible, and further objects of the invention are to provide for satisfactory temperature compensation and the adjustment of the damping flux of such magnets under these conditions.

Another divisional application Serial No. 160,476, filed May 6, 1950, relates to the method used in embedding and magnetizing the permanent magnets.

We prefer to make use of permanent magnet material of exceptionally high external energy and residual force so that such magnets may be made sufficiently small and light as to be cast as an integral part of the die-cast meter frame which supports the driving magnets and meter bearings. Permanent magnets suitable for our purposes may be made as described in United States Patent No. 2,295,082. Such permanent magnets have the maximum value of BH or available energy yet obtained in commercially available magnets.

One precaution which it is necessary to take in connection with polarized permanent magnets of the type which we prefer to use is to avoid accidental contact with other magnetic materials. For instance, if the magnet be touched with an ordinary steel screw driver, the latter short circuits that portion of the magnet with which it comes in contact, and the magnet is appreciably reduced in strength. Our magnets being embedded in nonmagnetic diecast material prior to final polarization are thus protected from this danger.

Although our permanent magnets are positioned quite close to the meter driving magnets to reduce side thrust in the manner explained in Kinnard Patent No. 2,272,748, they are nevertheless fully protected against demagnetization by current surges which may occur in the driving meter coils and conductors by reason of being surrounded with the die-cast material which is good conducting material and thus damps out flux surges. Our permanent magnets are, furthermore, made C-shaped with poles of permanent magnet material on opposite sides of the meter disk so as to avoid changes in damping strength occurring due to variations of the position of the disk across the damping flux gap. Our damping magnets are further positioned and arranged symmetrically to the driving force eddy currents in the meter disk so as to reduce vibrations set up by interaction between such eddy currents and damping flux as taught in Trekell Patent No. 2,316,368.

Although our damping magnets are substantially fully encased in a die-cast, nonmagnetic meter frame and fixed in position, provision is made both for temperature compensating shunts therefor and for varying the effective damping magnet strength for meter calibration purposes. The amount of magnetic material employed in our damping magnet system as used in a watthour meter is less than one-fourth of that usually employed in present commercial watthour meters. Besides this we eliminate all bracket supporting and position adjusting structure for the drag magnet system of such commercial meters.

The features of our invention which are believed to be novel and patentable will be pointed out in the claims appended hereto. For a better understanding of our invention, reference is made in the following description to the accompanying drawing in which Fig. 1 is a front view of a watthour meter, certain parts being in section, incorporating our invention. Fig. 2 is a rear view of a portion of the meter die-cast frame showing the location of the drag magnets. Fig. 3 is a sectional bottom view of portions of the meter showing the location of one of the drag magnets relative to the shaft and armature. Fig. 4 is explanatory of the polarization of the drag magnets when assembled in the meter frame. Figs. 5 and 6 are sectional and end views of a preferred load adjusting shunt arrangement for one of the drag magnets.

Referring to the drawings, 1 represents the case, 2 the glass front cover, and 3 the terminal chamber cover of a single phase alternating current watthour meter. A disk 4 of conducting material is mounted for rotation with a shaft 5 supported in upper and lower bearings at 6 and 7. The shaft 5 is geared to and drives a register having a plurality of pointers 8 located at the upper front of the meter. The disk 4 is driven by fluxes from a voltage electromagnet located above the disk and a current electromagnet located below the disk. In the type of meter shown, the voltage electromagnet has an E-shaped core 9 with the open side of the E facing the disk and with a voltage coil 10 on the center core leg. The current electromagnet has a U-shaped core 11 with its open end facing the disk with current coils 12 on both legs. The voltage and current core structures are joined by side magnet yoke portions 13 which extend outside the periphery of the disk 4. As usual, the magnetic core structure is secured to the back side of a meter framework 14 having a slit 15 to accommodate the meter disk 4. The meter bearings are supported on the front side of such meter frame as is also the register. The frame of the register is represented at 16. The meter frame is made of nonmagnetic die-cast material and is provided with the necessary supporting bosses, posts and bolt holes for securing the meter parts thereto and for securing the meter frame in the meter casing. The coils are connected to the terminal chamber through wires and connectors, the latter being represented at 17. In general, the structure thus far described conforms to existing meters.

Usually the meter frame is also provided with a projecting bracket upon which a drag magnet assembly is clamped, part or all of which is adjustable for the purpose of adjusting the damping or retarding force. We depart from this construction and provide relatively small, high strength damping magnets 18 cast with and embedded in the die-cast meter frame 14 and, hence, nonadjustable with respect thereto. These damping magnets are contained within relatively small pockets at 19 in die-cast material at the periphery of the meter disk 4 on about diametrically opposite sides thereof. The magnets are C-shaped so as to embrace the periphery of the disk 4 with their pole pieces facing each other with the disk intervening and with the yoke of the magnet joining the pole pieces outside the disk periphery. The slot 15 in the frame is in communicating alignment with the openings between the poles of the C-shaped magnets 18. The yoke of these magnets has a somewhat greater cross section than have the pole pieces, the cross-sectional area tapering from the center of the yoke to the pole pieces to obtain the most efficient utilization of the permanent magnetic material used for the purpose in question. As illustrated, these magnets are encased in the die-cast material both inside and outside, except at their pole faces which face the meter disk. Thus in the drawing, the C-shaped ring 20 on the inside of the magnets is die-cast material integral with the meter framework.

Resting flat against the back side of these magnets as viewed in Fig. 1 (front side as viewed in Fig. 2) is a thin C-shaped section of magnetic material 21 having low permeability and having a negative temperature coefficient of permeability of the correct dimensions and characteristics to correct the meter for temperature errors. These compensators shunt a relatively small portion of the permanent magnet flux from between the pole pieces, and the amount of such flux which is shunted decreases with rise in temperature. The nature of the temperature errors which occur in induction watthour meters and compensation therefor are discussed in United States Patent to Kinnard No. 1,706,171, March 19, 1929, and although we employ the same principle, the structural arrangement of our compensation is necessarily quite different from that disclosed in the Kinnard patent. In our compensator, the shunted flux and flux in the magnet flow in opposite directions. Our C-shaped compensator 21 is made of carpenter steel, a nickel-iron alloy containing about 29 per cent nickel and is cemented to the side of the permanent magnet subsequent to the anistropic heat treatment but before casting the magnets into the die-cast material. Each of the two drag magnets per meter unit assembly is preferably provided with the same compensation.

Also associated with one or both of the drag magnets 18 is a load adjusting device serving the purpose which in prior meters was generally accomplished by moving part or all of the drag magnet assembly to vary the damping and correctly adjust the meter speed for a given load. In our meter, the drag magnets are fixed in position and we provide for load adjustment by a magnetic shunt 22 which is contained within a tubular cavity 23 in the die-cast material which extends within the central opening in the C-shaped magnet and axially to one side thereof. The shunt 22 is made of soft iron, has a sliding fit in the tubular cavity in the die-cast material, is notched on the disk side at 24' so as not to touch the disk in any position of adjustment, and is provided with guide lips at the slot opening cooperating with guide lips machined in the die-cast material on either side of the disk gap as shown in Fig. 2 to prevent the shunt 22 from turning. Through the shunt 22 there is threaded a screw 24 having a screw driver fitting head accessible from the front of the meter and by means of which the screw may be turned with a screw driver. The screw is prevented from moving endwise in some way so that, when turned, it slides the shunt 22 into or out of the central opening in the permanent magnet.

In the arrangement shown in Figs. 2 and 3, the screw 24 has a recess groove or reduced diameter portion near the end opposite the head which projects out of the cavity 23 and passes through a hole in a brass plate 25, and is secured by a spring clip 26 entering the reduced diameter portion of the screw. The plate 25 and clip 26 are retained in place by screws 27, see Fig. 2. When the plate 25 is removed, the shunt 22 may be inserted into cavity 23 and the screw 24 threaded thereinto. When these parts are assembled as shown in Fig. 3, and at the right in Fig. 2, turning screw 24 adjusts the position of the shunt 22. While the shunt 22 is spaced from the magnet 18 by a tubular shield of the die-cast material, it will shunt flux away from the disk air gap between the poles of the permanent magnet in proportion to the extent to which the shunt is adjusted within the magnet. In maximum flux shunting position, it may shunt about five per cent of the damping flux of one magnet although not limited to this value. While such load adjusting shunt is indicated as being provided on both damping magnets in Figs. 1 and 2, it is generally necessary to provide only one of the magnets with such load shunt in order to obtain an ample range of load adjustment. The directions to turn the screw for fast and slow meter adjustments are preferably indicated by the markings cast in the frame as shown adjacent screw 24 at the right in Fig. 1.

The cavity 23 in the die-cast material for reception of the shunt 22 may be made perfectly cylindrical by machining or, if its surface remains as cast, the opening will be slightly conical or have a taper from its open to closed ends necessary for removal of the molding core part. In Figs. 2 and 3, the cavity is represented as having been reamed out perfectly cylindrically such that the shunt 22 has a good sliding fit therein at all points of adjustment. In Fig. 5 the recess 23 remains as produced by the die-casting process and has not been machined, and hence, has a taper which makes it slightly larger at the open end than at the closed end. If, therefore, the shunt 22 fits with a good sliding fit at the small end, it will be somewhat loose when at the open end of the cavity. To prevent any possible change in shunting effect when the shunt 22 is in an adjusted position where it has a loose fit in the cavity, the holding and adjusting arrangement consisting of screw 24 and spring clip 26 is arranged to urge the open end of the shunt 22 against the gap side surface of the cavity adjacent thereto or towards the right in Figs. 5 and 6 and thus prevent any variation in shunting effect due to movement of the shunt crosswise of the cavity, such as might otherwise be caused by vibration, etc. The shape of the shunt and cavity at the contacting surfaces prevents the shunt from turning as in Fig. 2.

To accomplish the desired result, the spring clip 26' of Figs. 5 and 6 is arranged to pull endwise on the screw 24 or downward in Fig. 5, and to urge its lower end to the right so as to keep the open end of the shunt 22 against the right-hand side of the cavity 23 adjacent the air gap side of the magnet 18 at all positions of axial adjustment of the shunt. The opening at 30 in the die-cast material about the neck of the screw at 24 is made sufficient to allow the screw to pivot about its head and allow the other end of the screw to move laterally sufficiently to accomplish this result. The spring clip 26' may be made of phosphor bronze. It has a yoke part 31 contacting the side of the frame 14 opposite the yoke of the magnet 18, a central slotted extension 32 embracing the reduced portion of the screw 24, and spreading spring fingers 33 and 34 the ends of which contact the side of the frame 14 to the right of the open end of the recess 23.

The clip is sprung outwardly at its central lateral portion and is compressed between the surface of the frame and recessed groove in the screw so that when in place, it pulls endwise downward on the screw 24, as viewed in Fig. 5, and keeps the head of the screw tight against the outer surface of the die-cast casing forming the closed end of the cavity, and hence, prevents endwise movement of the screw but allows it to be turned with a screw driver to adjust the shunt position axially of the recess. The spring clip 26' and the end of the screw 24 engaged thereby are urged to the right by reason of the fact that the outer ends of the spreading fingers 33 and 34 are sprung towards each other by being inserted between projecting abutments 35 on the surface of the frame 14. Prior to inserting the clip in place with the fingers 33 and 34 between the abutments 35, the fingers form a straight limbed V, and hence, their outer ends are sprung towards each other when inserted in place as shown, and this forms a resilient wedging arrangement of the spring clip towards the right which keeps the nose of the shunt 22 pressed against the gap side of the cavity 23. One or both of the ends of the fingers may overhang a shoulder on the side wall of the frame 14 as represented at the end of the lower finger to assist in this pull to the right. The spring clip is easily removed and replaced and is retained firmly in position by its own resiliency, and when in position, prevents endwise movement but allows lateral movement of its end of screw 24, and at the same time keeps it towards the right to the extent allowed by the shunt 22. This arrangement is less costly than the shunt adjusting arrangement shown in Fig. 3, as it involves a fewer number of parts, less machining, and may be more quickly assembled.

Our invention permits of a very large reduction in the material, weight, and space requirements of the drag magnet system as compared to earlier meters. We find it sufficient to use permanent magnets 18 which are of the following dimensions: External diameter of magnets 18, 1⅛ inches; with a maximum cross section at the center of the yoke of ½ inch square. The dimensions of the pole faces are ½ by ¼ inch. The dimensions here given in relation to other meter dimensions are as represented in the drawing. These magnets have a (BH) max. value of the order of 4,600,000 and a residual of the order of 12,000 gausses. The new drag magnet arrangement is intended to replace the arrangement shown in United States Faus Patent No. 2,196,898, and to represent a reduction in weight of magnetic material used in the two types of drag magnet systems of from approximately 300 to 68 grams.

After the magnets are made anisotropic, the temperature compensating shunts 21 are cemented to the one side of the magnets 18, using a high temperature, thermosetting plastic cement. The magnets are then die-cast as inserts with the frame. For the die-cast frame material, we may use a nonmagnetic, aluminum silicon alloy having a melting point of about 580° C. The die-cast material hardens and cools very quickly so that the magnets do not rise to the melting point of the die-cast material and do not remain at any elevated temperature for any length of time. The die-casting operation does not change the magnetic properties of the magnets at all. At this stage of manufacture, the magnets have not been polarized but merely rendered anisotropic along the desired magnetizing axis. All necessary machining operations are then performed on the die-cast frames. This includes reaming out the cavity 23 for the full load adjusting shunt, if necessary, drilling bolt and screw holes, etc. The operations are performed using a jig so that all dimensions are made exact.

The magnetization of the magnets 18 is accomplished while in the die-cast material in the manner represented in Fig. 4. Conductors 28 and 29 are inserted into the open ends of the cavities 23 and through the central openings in the pair of magnets 18 of a meter frame. Fastened between the ends of the conductors is a flat copper bar 36 thin enough to pass through the air gap slots in frame 14 and magnets 18 when the conductors 28 and 29 are inserted. One-half cycle current of a 60-cycle wave having a crest value of 25,000 amperes is then passed through the circuit 28—29—36 as represented by arrows in Fig. 4. This current flows through the magnets in opposite directions and polarizes them in the definite polarity relation represented by N and S pole designations of Fig. 1. (Where drag magnets of a different polarity arrangement are desired, the magnetizing current may be passed through the magnets in the same direction.) The magnets are then knocked down by an A. C. field. This is a knockdown of the order of fifteen per cent. The meter is then assembled and while in operation under load, a further knockdown is used as required. This knockdown is sufficient to reduce the magnets to approximately the desired strength as measured by meter speed under rated load. The magnets have and retain a high magnetic strength available as damping flux across the air gap, and the amount of such flux available for damping may be reduced as necessary by the shunt or shunts 22.

The fact that the magnets 18 are encased in non-magnetic conductor material is highly advantageous from several standpoints. They are protected from accidental contact with other magnetic tools or parts which might cause a short circuit of a section of the magnet, resulting in a reduction in magnetic strength. The die-cast material prevents the magnets from collecting magnetic dust, such as iron filings, tool shavings, etc., except at the air gap, and it is much easier to keep them clean and to prevent such material from being carried on the magnets into the finished meter. For protection until the meter disk is installed, wooden or other nonmagnetic material wedges may be inserted into the magnet air gaps since this is the only point of the magnets not covered by the die-cast material. However, we may provide a thin die-casting wall over pole faces also. When assembled in an operative meter, the die-cast material of the frame comes between the magnets and the coils of the meter and is effective in preventing demagnetization of the magnets by surge currents that may accidentally occur in the meter coils during operation due to short circuits, lightning, etc.

The drag magnets are fixed in position with respect to all remaining stationary parts of the meter by the meter framework, and hence, no accidental variation of the position of the drag magnet gaps can occur with respect to the driving magnet pole faces, meter bearings, etc. This is a desirable condition. It makes it possible to remove the meter disk and shaft and replace it with minimum risk of changing the meter calibration, and makes it more feasible to employ magnetic bearing suspension for the shaft 5. The bearings at 6 in our meter may and preferably will be of the magnetic suspension type described in United States Patent No. 2,311,382 to Hansen, Jr., and will support the entire weight of the rotating element. The supports for these bearings are cast integral with the frame. It will be noted that the damping magnets are symmetrically placed with respect to a center line between the axis of rotation and the center of the driving magnet system, that a line drawn between the centers of the damping magnets passes on the driving magnet side of the shaft 5, and that the damping magnets are fairly close to the driving magnet. This arrangement is beneficial in reducing side thrust on the meter disk and shaft as explained in United States Patent to Kinnard No. 2,272,748, February 10, 1942. It will also be noted from the polarity arrangement of the damping magnets represented in Fig. 1 that the damping fluxes pass through the disk 4 in the same direction on both sides of the shaft, and that such damping fluxes are equally distant from and symmetrically positioned relative to the shaft. This arrangement is beneficial in reducing disk vibration due to interaction between the damp flux and disk eddy currents produced by the voltage fluxes, as explained in connection with Fig. 3 of United States Patent to Trekell No. 2,316,638, April 13, 1943.

In using our invention in meters having two or more driving magnet systems, the extra systems will preferably have their own die-cast frame section including the embedded damping magnets described.

In accordance with the provisions of the Patent Statutes we have described the principle of operation of our invention, together with the apparatus which we now consider to represent the best embodiment thereof, but we desire to have it understood that the apparatus shown is only illustrative and that the invention may be carried out by other means.

What we claim as new and desire to secure by Letters Patent of the United States is:

1. A damping magnet structure suitable for integrating meters comprising a C-shaped permanent magnet, a temperature compensating shunt therefor consisting of a relatively thin strip of magnetic material having a negative temperature coefficient of permeability secured on and extending substantially over one side face of said magnet, a shunt for adjusting the effective damping flux of said magnet comprising a piece of magnetic material adjustable in an axial direction in and out of the central opening in the C-shaped magnet in proximity to but spaced from the poles of said magnet, and a support for said magnet comprising a die-cast framework of nonmagnetic material in which said magnet and temperature compensating shunt are embedded during the die-casting operation and with die-cast material forming a partition between said adjustable shunt and magnet, said framework having a slot in communicating alignment with the opening between the poles of said C-shaped magnet.

2. In an integrating device, a frame structure of non-magnetic material, a C-shaped damping magnet embedded in the material of said frame structure with an opening in such structure in alignment with the central opening in the C of the magnet and with a slot in said frame structure in communicating alignment with the opening between the poles of said C-shaped magnet, means for adjusting the air gap flux of said magnet comprising a piece of magnetic material movable in the opening in said frame structure in and out of the central opening in the C-shaped magnet and serving as an adjustable flux shunt for such magnet, a screw threaded through said shunt axially of and extending through said aligned openings, and bearing means supported by said frame structure at opposite ends of said screw permitting the screw to be turned to adjust the position of said shunt but preventing the screw from moving endwise, one of said bearing means being removable to permit the insertion of said shunt.

3. In an integrating device, a frame of nonmagnetic die-cast material and a C-shaped drag magnet embedded therein and immovable with respect thereto, said frame having an opening in alignment with the central opening in the C of the magnet, a magnetic shunt for adjusting the effective air gap flux of said magnet consisting of a piece of magnetic material shaped to be slid axially in said opening in contact with said frame to different flux shunting positions relative to the magnet, the contacting surfaces of said shunt and frame being shaped to prevent the shunt from turning, a screw extending through said aligned openings and threaded through said shunt, the opening in the frame being closed at one end except for an unthreaded hole for said screw, the exterior surface adjacent said hole forming a bearing surface for the screw head, and a removable spring clip at the other end of said opening rotatively supporting the other end of said screw and providing tension on said screw to hold its head against its bearing surface and preventing axial movement of the screw, said frame also having a slot in communicating alignment with the opening between the poles of said C-shaped magnet.

4. In an integrating device, a frame of non-magnetic die-cast material and a C-shaped drag magnet embedded therein, said frame having a tapered opening cast therein in alignment with the central opening in the C of the magnet, a magnetic shunt for adjusting the flux between the pole faces of said magnet consisting of a piece of magnetic material of a size and shape to be slid axially in said tapered opening in contact with said frame to different flux shunting positions relative to the magnet, the contacting surfaces of the shunt and frame being shaped to prevent the shunt from turning, a screw extending through said aligned openings and threaded through said shunt, bearing supports for said screw at either end which permit the screw to be turned but which prevent axial displacement, one of said bearing supports permitting limited pivoting action of the screw and the other bearing support comprising a removable resilient spring clip compressed between the exterior wall of said frame at one end of the opening therein and a recessed groove in the corresponding end of the screw and providing tension on the screw, said clip having bearing surfaces against the wall of the frame such as to provide a lateral resilient bias on the clip in one direction to maintain the shunt against the same side of the tapered opening for all positions of its axial adjustment.

JAMES H. GOSS.
LEWIS I. MENDELSOHN.
HANS A. BAKKE.

REFERENCES CITED

The following references are of record in the file of this patent:

UNITED STATES PATENTS

| Number | Name | Date |
|---|---|---|
| 2,501,535 | Nobbs | Mar. 21, 1950 |